United States Patent
Aljadeff et al.

(10) Patent No.: US 7,295,115 B2
(45) Date of Patent: Nov. 13, 2007

(54) RADIO-FREQUENCY IDENTIFICATION (RFID) TAG EMPLOYING UNIQUE RECEPTION WINDOW AND METHOD THEREFOR

(75) Inventors: Daniel Aljadeff, Kiriat Ono (IL); Reuven Amsalem, Nes-ziona (IL)

(73) Assignee: AeroScout, Ltd., Rehovot (IL)

( * ) Notice: Subject to any disclaimer, the term of this patent is extended or adjusted under 35 U.S.C. 154(b) by 235 days.

(21) Appl. No.: 11/059,047

(22) Filed: Feb. 16, 2005

(65) Prior Publication Data

US 2005/0156711 A1    Jul. 21, 2005

Related U.S. Application Data

(63) Continuation-in-part of application No. 10/274,698, filed on Oct. 18, 2002, now Pat. No. 6,963,289.

(51) Int. Cl.
*G08B 13/14*    (2006.01)

(52) U.S. Cl. ............... 340/572.1; 340/10.1; 340/10.34; 340/825.21; 342/44

(58) Field of Classification Search ............. 340/572.1, 340/539.1, 10.1, 10.3, 10.31, 10.41, 825.72, 340/10.34, 825.21; 342/44, 51
See application file for complete search history.

(56) References Cited

U.S. PATENT DOCUMENTS 6,070,240 A * 5/2000 Xydis .......................... 726/17
6,084,512 A * 7/2000 Elberty et al. ............ 340/572.1
6,104,279 A * 8/2000 Maletsky .................. 340/10.41
6,512,478 B1 * 1/2003 Chien ..................... 342/357.09
6,917,291 B2 * 7/2005 Allen ....................... 340/572.1
7,042,353 B2 * 5/2006 Stilp ....................... 340/539.22
2004/0046016 A1   3/2004 Becker et al.
2004/0078151 A1   4/2004 Aljadeff et al.

FOREIGN PATENT DOCUMENTS

WO    WO 2005/013190 A1    10/2005

\* cited by examiner

*Primary Examiner*—Davetta W. Goins
(74) *Attorney, Agent, or Firm*—Jeffrey D. Moy; Weiss & Moy, P.C.

(57) ABSTRACT

A radio-frequency identification (RFID) tag employing a unique reception window and method for operating the tag system provides low-power operation for enhanced tag battery life, while providing addressable tags that can receive commands and data from the system, which can be a wireless local area network (WLAN) incorporating location finding for locating the tags. Interference with other tags and other transmitters is prevented by either using a sniffer circuit to determine that no network transmission is in progress, or by using a special non-interfering coding sequence. A receiver within the tag is operated for a predetermined period of time after a periodic transmission is made from the tag, and an address decoder determines if the tag is being addressed. The receiver can receive data and/or commands after being addressed and is shutdown if the window time elapses, the tag is not addressed, or at the completion of data/command transfer.

24 Claims, 5 Drawing Sheets

RADIO-FREQUENCY IDENTIFICATION (RFID) TAG EMPLOYING UNIQUE RECEPTION WINDOW AND METHOD THEREFOR

CROSS-REFERENCE TO RELATED APPLICATIONS

The present application is a Continuation-in-Part of U.S. patent application Ser. No. 10/274,698 filed on Oct. 18, 2002 now U.S. Pat. No. 6,963,289 and is further related to previously-filed United States Patent Applications assigned to the same assignee: "METHOD AND APPARATUS FOR ENHANCING SECURITY IN A WIRELESS NETWORK USING DISTANCE MEASUREMENT TECHNIQUES", Ser. No. 10/156,244, filed May 24, 2002; "METHOD AND APPARATUS FOR INTRUSION MANAGEMENT IN A WIRELESS NETWORK USING PHYSICAL LOCATION DETERMINATION", Ser. No. 10/171,427, filed Jun. 13, 2002; and "METHOD AND SYSTEM FOR LOCATION FINDING IN A WIRELESS LOCAL AREA NETWORK", Ser. No. 10/225,267 filed Aug. 20, 2002. The specifications of the above-referenced U.S. Patent Applications are herein incorporated by reference.

BACKGROUND OF THE INVENTION

1. Field of the Invention

The present invention relates generally to wireless networks, and more specifically, to a low power radio-frequency identification tag and system for determining the physical location of tagged items.

2. Background of the Invention

Radio-frequency identification (RFID) tags are becoming widespread for locating items such as store inventory and corporate assets, as well as for employee locating via RFID badges. Locating stations are typically part of a dedicated wireless system for receiving tag signals from the RFID tags. Reception information is gathered from multiple location stations and the location of the RFID tags is determined at a central master station.

The above-incorporated parent application discloses an RFID tag system using a Wireless Local Area Network (WLAN) channel that takes advantage of existing WLAN infrastructure to locate RFID tags. The tags provide low-power operation by using a "sniffer" to determine whether a WLAN channel is busy, and transmit only if the channel is free. The operation thus avoids generating interference with WLAN operations and other tags, and also reduces power consumption, as the sniffer circuit does not require the power that a complete receiver circuit would.

However, it is not possible for a sniffer circuit to determine whether or not the tag is being addressed by the WLAN system, as the sniffer does not include circuitry decode messages in order to determine a recipient. The tag also cannot receive commands or data. Therefore, the above-mentioned system is limited in that tag configuration and operational characteristics are fixed and cannot be adjusted by the system.

Therefore, it would be desirable to provide an improved RFID tag and method of operation, so that tags may be addressed while maintaining low power consumption and so that commands and/or data can be sent to the tag.

SUMMARY OF THE INVENTION

The above objective providing an improved RFID tag that provides low power operation while receiving commands and/or data from the system is provided in a RFID tag and method for operating an RFID tag.

Tag signals are transmitted periodically at predetermined intervals and avoid disrupting the operation of the system by transmitting either after a sniffer circuit determines that no other transmissions are in progress or using a proprietary PN code sequence or preamble differing from other tag and system signals. The tag may be located by location units and a master station for receiving the above-described transmissions and the location receivers may be specially modified to receive the broadcast address and proprietary PN code sequence or preambles.

After a tag transmits, a receiver within the tag is activated for a predetermined period of time, during which the system can address the tag and subsequently send data and/or commands to the tag. After the predetermined time has elapsed or after an address decoder determines that the tag has not been addressed, the receiver is deactivated until after the next transmission period.

The foregoing and other objectives, features, and advantages of the invention will be apparent from the following, more particular, description of the preferred embodiment of the invention, as illustrated in the accompanying drawings.

DETAILED DESCRIPTION OF THE ILLUSTRATIVE EMBODIMENT

The present invention includes improvements to the radio-frequency identification (RFID) tag disclosed in the above-incorporated parent application, which includes illustrative embodiment of RFID tags for use in a wireless local area network (WLAN) environment. The RFID tags of the present invention include circuitry implementing a reception window during which receiver circuits are powered subsequent to a periodic transmit interval of the RFID tags. The WLAN or other system may address individual tags thereby without requiring that the tag receiver be constantly active and thereby receive all signals transmitted by the system. It should be understood by those of ordinary skill in the art that the present invention applies to other forms of identification tags, as well. For example, low frequency identification tags may be made and operated in accordance with embodiments of the present invention that are not WLAN-compatible.

Figure 1:
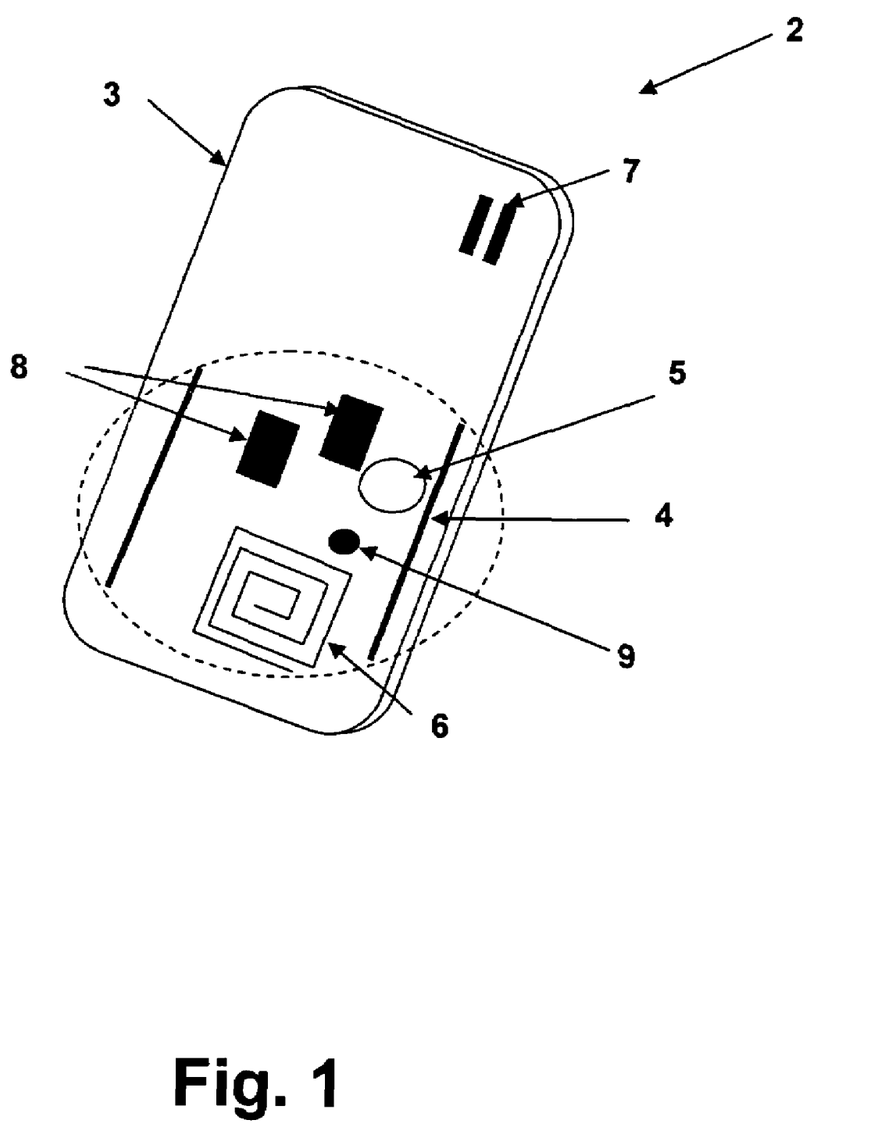
FIG. 1 is a pictorial diagram showing an RFID tag in accordance with an embodiment of the present invention.

Referring to the figures, and in particular to FIG. 1, a radio-frequency identification (RFID) tag 2, is depicted in accordance with an embodiment of the present invention.

Tag 2 includes a printed circuit substrate 4 on which electronic components 8 are interconnected via conductive patterns on substrate 4 to form the tag circuits. The circuits generally comprise a transmitter for transmitting a signal on a wireless local area network (WLAN) channel, for reception by location units coupled to a WLAN. A battery 5 supplies power to the electronic circuit. An antenna 6 is coupled to the transmitter for launching the transmitted WLAN channel signal for reception by location units. Substrate 4 and electronic components 8 are covered with a housing 3, which may include surface decoration forming an identification badge, apertures through the housing for attachment to key rings or cords for using tag as a pendant, etc. A sensor 9 may be included within housing for measuring characteristics such as temperature, infrared signals, etc. and/or a connector 7 may be disposed on the outside of housing 3 for coupling an external sensor to the tag circuits.

Figure 2:
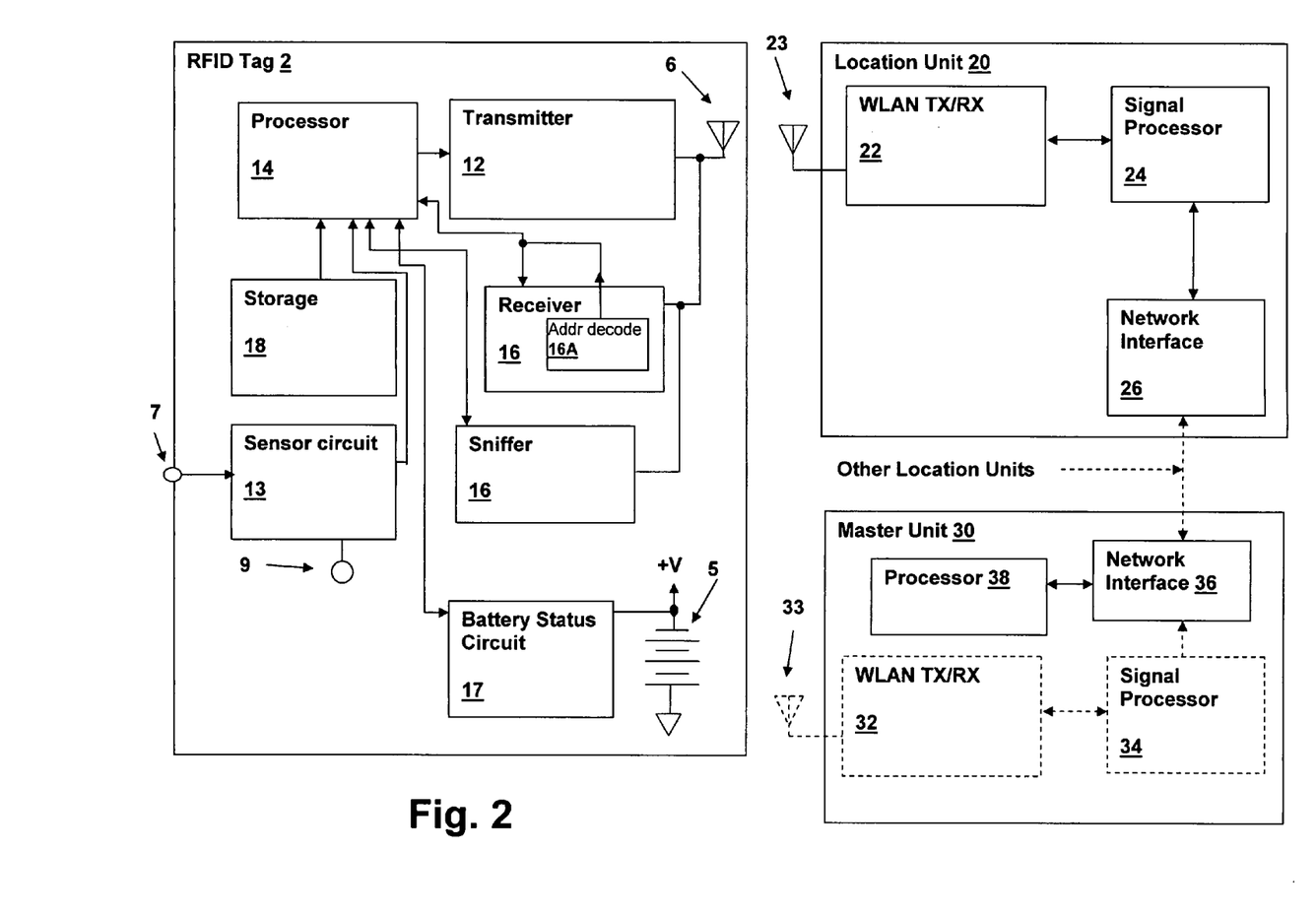
FIG. 2 is a block diagram depicting a wireless network including an RFID tag in accordance with an embodiment of the present invention.

Referring now to FIG. 2, a WLAN including an RFID tag 20 in accordance with an embodiment of the present invention is depicted. RFID tag 2 includes a transmitter 12 that transmits a signal generated by a processor 14, on a channel of the WLAN, via antenna 6. The transmitted signal is transmitted periodically at predetermined intervals and includes a broadcast address not corresponding to a specific unit within the WLAN. The transmitted signal as a minimum includes an identification number or address associated with tag 2 that is retrieved from storage 18, which may also store processor 14 instructions and data. Tag 2 may transmit at multiple frequencies in sequence, so that tag 2 may be located when tag 2 is moved through adjacent cells operating at different frequencies.

Tag 2 also includes a receiver 16 that includes an address decoder 16A for receiving signals from the WLAN system. Receiver is coupled to processor 14 for providing received data and command information to processor 14 and for receiving control information from processor 14. Processor 14 controls a power state of receiver 16, so that receiver is only powered-up when desirable. In particular, a timer within processor 14 (or alternatively provided by discrete logic within tag 2) controls an activation window of receiver 16 which is commenced immediately (or at a fixed or programmable delay) after transmitter 12 completes its periodic transmission. The WLAN or other system, upon recognizing a transmission from tag 2, may send commands and/or data to tag 2 during this interval, and the timer ensures that receiver 16 is active to receive the data and/or commands.

The reception window may be terminated if address decoder 16A determines that an address included in the received signals does not match the address of tag 2 (which may or may not be the identifier transmitted by tag 2).

Storage 18 includes stored parameters for controlling transmissions of the tag. In particular, storage 18 may contain values for controlling the interval between transmissions, the length of the transmissions, the amplitude of the transmissions, and the start time of the transmissions (for synchronization). The parameters may be set for all tags from a global command or from individual commands either encoded with a tag address or having address information embedded in a broadcast message. Alternatively, a field in an address of a message may contain parameter information that is extracted upon reception by one or more tags. Transmission parameters may also be set by an external tag programming device or another input device connected to the tag(s). By providing control of the transmission interval from either or both of the tag and the system, flexible control of the tag transmissions is achieved. For example, the network may increase the transmission length if collisions are preventing proper recognition of a large number of tags, or shorten the transmission length to preserve battery life. A tag programmer may be used to configure particular tags where for example, the range of distances for a tag is known and amplitudes and/or transmission lengths are set accordingly.

A sensor circuit 13 coupled to processor 14 may be included to receive signals from or send signals to external device/sensor connector 7 or internal device/sensor 9 and a battery status monitoring circuit 17 may also be coupled to processor 14. Battery status circuit 17 and sensor circuit 13 provide information to processor 14 that may be transmitted along with the tag ID to the location units. Received commands and/or data may be used in conjunction with battery status circuit 17, sensor connector 7 and internal sensor 9 to retrieve battery status information from tag 2, and send commands and/or data to device/sensor 79 or an external device connected to connector 7.

A sniffer circuit 16 is included to determine whether or not the WLAN channel is clear. If the WLAN channel is clear, the transmitted signal is transmitted at the predetermined time, otherwise a back-off algorithm is applied as specified by the particular WLAN specification employed by the WLAN and the signal is transmitted subsequently when the channel is clear. The predetermined reception window may optionally be delayed if the transmission is delayed, but as the WLAN system addresses the tag in response to the tag's own transmission, operation of the reception window is otherwise unaffected.

Alternatively, sniffer circuit 16 may be omitted, in which case the transmitted signal is differentiated from the standard WLAN signals by using a non-standard code sequence or a non-standard preamble. A longer or differing code sequence may be employed rather than the 11-chip Barker code employed in IEEE 802.11b/g networks, so that the receiver correlators within standard network units will not be disrupted by the signal and only the location units will receive the signal. A differing (non-standard) preamble will cause the receiver frame decoders to ignore the transmitted signal, also avoiding disruption of the network, and a combination of any of the above techniques may be employed, including use of sniffer circuit 16 with a non-standard signal. Sniffer circuit 16 may be a signal amplitude detector (peak detector) or may include a correlator, a symbol matched filter and a message decoder. In a preferred embodiment, sniffer circuit 16 does not include a network interface, MAC packet formatter or message decoder, only what is necessary to determine whether or not the WLAN channel is in use. When optional sniffer circuit 16 is used, collisions between tag communications are normally avoided, thus improving the chance of receiving tag transmissions without errors. Battery life is improved by reducing the number of transmissions required and also by reducing the number of reception windows during which receiver 16 would be activated.

In a particular embodiment that employs TDOA location finding, at least three location units 20 are used in the present invention to determine the position of RFID tag 2 and one Master unit 30 is needed to compute the physical position of tag 2. Master unit 30 may include receiver circuits to serve as one of location units 20. Location unit 20 includes an antenna 23 coupled to a WLAN transmitter/receiver 22 for receiving WLAN signals, including signals from RFID tags 2. WLAN transmitter/receiver 22 coupled to a signal processor 24 for decoding and extracting messages from received signals. If tags 2 transmit a non-standard preamble or code sequence, appropriate decoders and frame receivers are incorporated within signal processor 24 to receive the non-standard WLAN transmissions from tags 2. Also, a non-standard modulation type, bit rate and/or format may be transmitted by tags 2 in order to avoid interfering with or being recognized as standard WLAN transmissions. Signal processor 24 also determines the time-of-arrival of signal received from tags, for transmission to master unit 30 through a network interface 26, so that the position of tags 2 may be calculated. Network interface 26 may be a wired interface, but also may be wireless, in which case the connection to master unit 30 is made back through the transmitter portion of WLAN transmitter/receiver 22 and antenna 23.

Master unit 30 includes a processor 38 coupled to a network interface 36 that receives time-of-arrival information from location units 20 and calculates the position of tags 2 in conformity with the differences between times-of-arrival at location units 20. As mentioned above, master unit 30 may serve as one of location units 20 by including an antenna 33, a WLAN transmitter/receiver 32, and a signal processor 34 compatible with the tag 2 signals. If master unit 30 is also a location unit, then two other location units 20 must be employed to determine the position of tag 2. More than three receiving units may be employed to determine tag 2 location with a greater degree of certainty.

The system depicted in FIG. 2 provides location finding of tags 2 in the presence of a wireless network, such as a WLAN (e.g., IEEE 802.11) or WPAN network, by calculating the time-difference-of-arrival (TDOA) for signals received from tags 2. Once the location of a tag is determined using the TDOA, the tag can be mapped in a network facility map, and property and personnel security can be managed in conformity with the tag location. In existing wireless network devices (generally the access points or "APs") may be enhanced to provide a TDOA measurement of tag without adding a separate infrastructure, thereby providing position determination and consequent enhanced network security with low incremental cost. The above-mentioned APS also or alternatively locate tags via signal strength (RSSI) determination, as will be disclosed below. Location units and master units (with appropriate modification if non-standard preambles or code sequences are transmitted by tags 2) in accordance with those described in the above-incorporated patent application "METHOD AND SYSTEM FOR LOCATION FINDING IN A WIRELESS LOCAL AREA NETWORK", may be used to detect the location of both tags 2 as well as mobile or stationary WLAN units.

Figure 3:
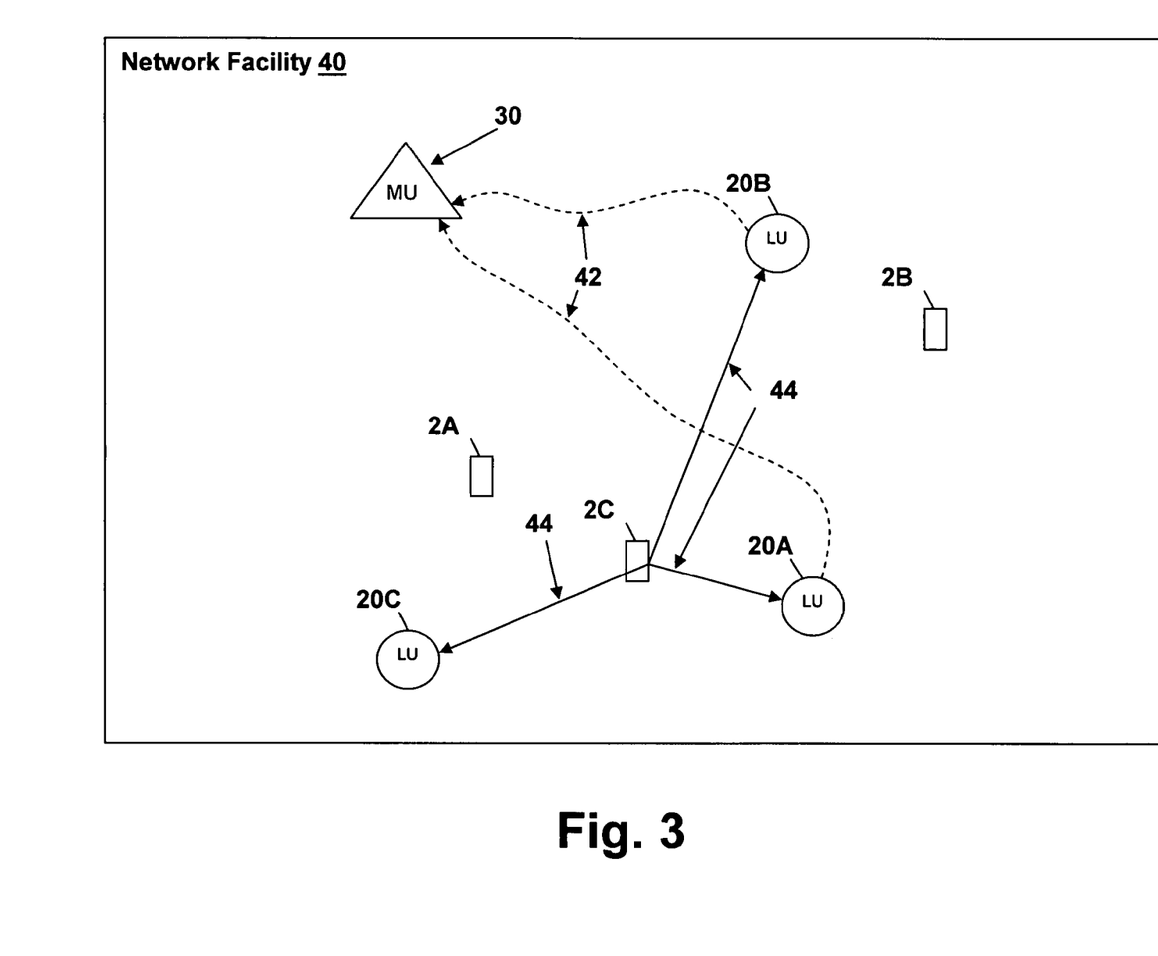
FIG. 3 is a pictorial diagram of a wireless network including tags in accordance with an embodiment of the present invention.

In TDOA techniques, the location of a transmitting source can be determined by triangulation based on the timing between the signal arrivals at the multiple receivers. Referring now to FIG. 3, a wireless network is depicted in a pictorial diagram. Location units (LUs) 20A, 20B and 20C include time-of-arrival (TOA) electronics and software for measuring the arrival time of signals from tags 2A-2C. The time difference between reception of signal 44 (transmitted by tag 2C) by location unit 20A and reception of signal 44 by location unit 20B and 20C permits triangulation of the physical location of tag 2C. The time-of-arrival information of signal 44 as received by location units 20A, 20B and 20C are sent via network connections 42 (which may be the WLAN channel as mentioned above) and master unit 30, knowing the location of location units 20A, 20B and 20C and the times-of arrival of signals 44, computes the physical location of tag 2C.

Figure 4:
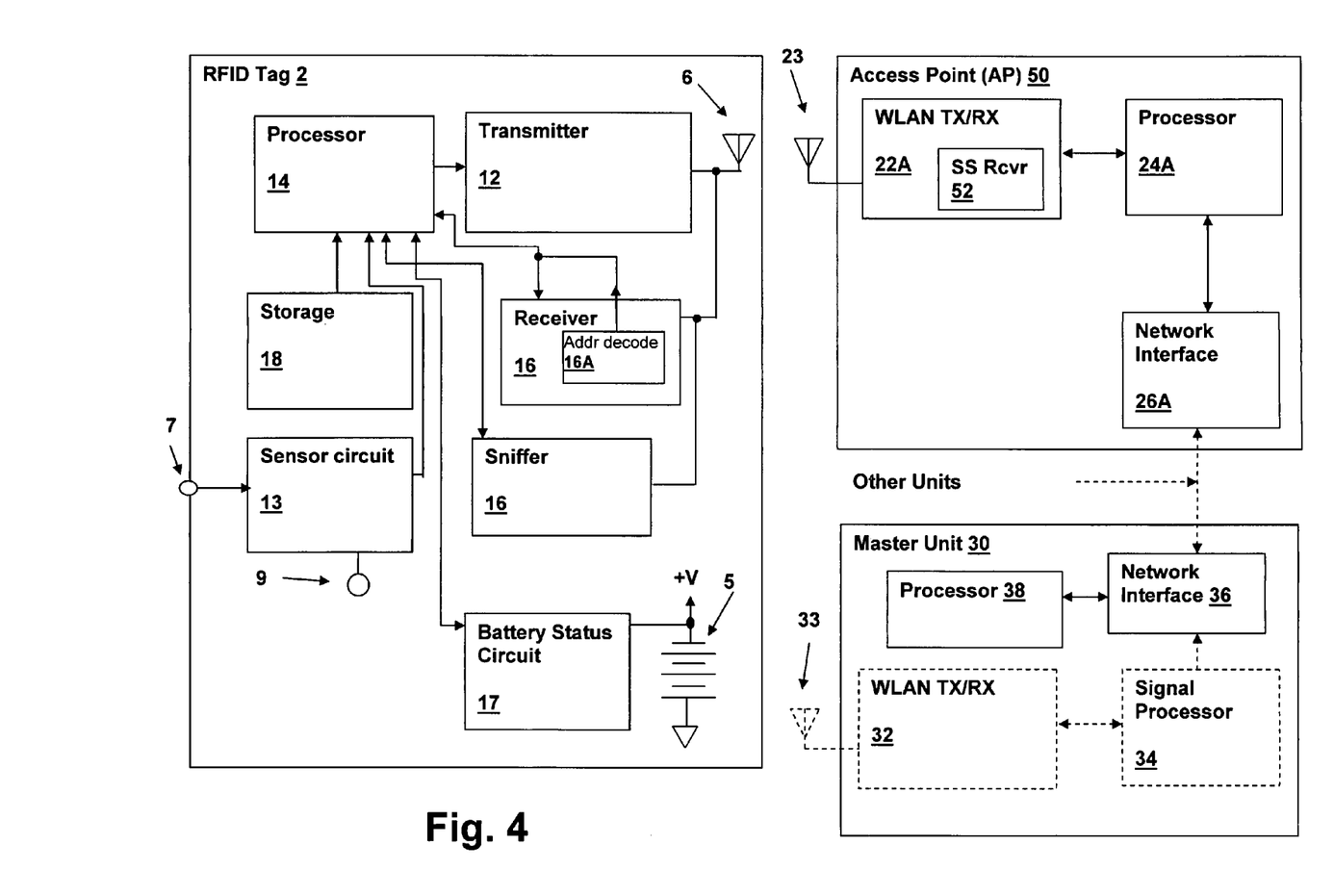
FIG. 4 is a block diagram depicting an alternative wireless network including an RFID tag in accordance with an embodiment of the present invention.

With reference now to FIG. 4, in another embodiment of the invention that employs signal strength measurements for location finding, standard access points (APs) 50 in the WLAN include signal strength measuring receivers 52 that determine a signal-strength (RSSI) of signals received from a tag. Tag 2 and master unit 30 operate as described above with respect to FIG. 2, therefore only differences in operation and structure will be described below. Processor 24A does not require the signal processing capabilities of processor 24 if signal strength measurements alone are used to determine location of tag 2.

The location of tag 2 is determined by using the signal strength that arrives at one or multiple APs 50 as determined by measuring receivers 52. By comparing signal strength indications (as opposed to TDOA information in FIG. 2) received from the multiple APs 50 to a known signal strength of the tag signal, or by comparison of relative signal strengths at multiple APs 50, master unit 30 can determine the location of tag 2. While the networks employing TDOA measurements for tag location-finding and RSSI techniques for location-finding are illustrated separately herein, it should be understood that both techniques may be combined in order to further refine tag location information. Therefore, use of RSSI techniques and TDOA techniques are not mutually exclusive and can be used to resolve ambiguities or correct error from sources such as multipath distortion.

Figure 5:
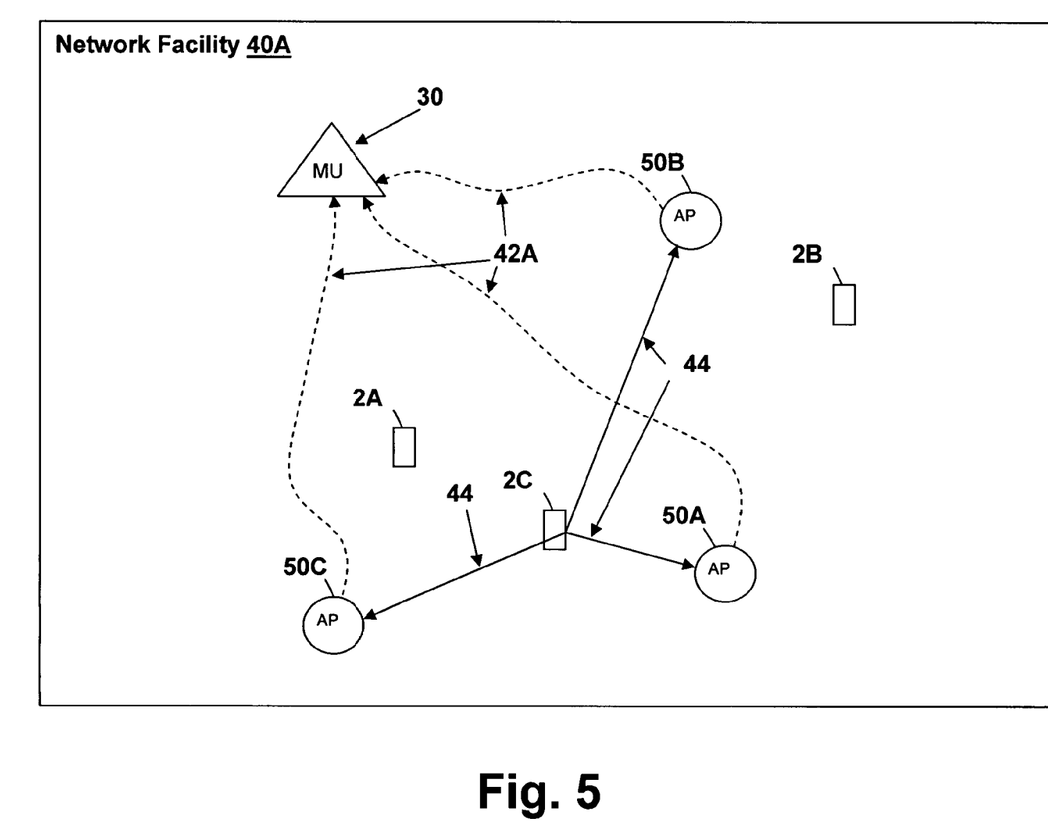
FIG. 5 is a pictorial diagram of an alternative wireless network including tags in accordance with an embodiment of the present invention.

Referring now to FIG. 5, an alternative network is depicted in a pictorial diagram in accordance with an embodiment of the present invention. The received signal strength (RSSI) of signal 44 (transmitted by tag 2) determined at access point 50A and preferably also by reception of signal 44 at other access points 50B and 50C permits calculation of the approximate physical location of tag 2. The signal strength information of signal 44 as received by access points 50A-C is sent via network connections 42A (which may be the WLAN channel as mentioned above or a wired channel) and master unit 30, knowing the location of access points 50A-C and the signal strength of signal 44, computes the physical location of tag 2.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A wireless identification tag, comprising:
   a battery for powering internal circuits of said tag;
   a transmitter for transmitting signals encoding at least an identifier of said tag;
   a receiver for receiving system signals from an external system in communication with said tag, wherein said system signals include a tag address; and
   a timer for activating said receiver for a predetermined period of time subsequent to said transmitter transmitting said signals, whereby said system signals are received by said tag during a predictable window subsequent to transmissions of said tag, and whereby power consumption from said battery is further conserved;
   a storage for storing parameters of said tag, said parameters including one or more values corresponding to: said predetermined period of time, a period of said transmitted signals, a start time of said transmitted signals and an amplitude of said transmitted signals, and wherein said transmitter produces said transmitted signals in conformity with said stored parameters, when the period of said transmitted signal is shortened.

2. The wireless identification tag of claim 1, wherein said receiver further comprises an address decoder for determining whether or not said tag address matches a particular address of said tag, and wherein said receiver is deactivated in response to determining that said tag address does not match said particular address of said tag.

3. The wireless identification tag of claim 2, wherein said predetermined period of time is extended in response to said address decoder determining that said tag address matches said particular address of said tag, whereby said receiver is operated in order to receive at least one of a command and data from said system.

4. The wireless identification tag of claim 1, wherein said receiver receives commands from said external system and sets said parameters in conformity with said received commands.

5. The wireless identification tag of claim 1, wherein said receiver receives transmissions from said external system and sets said parameters in conformity with fields within an address of said transmissions.

6. The wireless identification tag of claim 1, wherein said transmitter further transmits at least a portion of said parameters, whereby said external system can determine one or more of said one or more values stored within said wireless identification tag.

7. The wireless identification tag of claim 1, further comprising a processor coupled to said receiver for responding to commands received from said system bearing a tag address matching a particular address of said tag.

8. The wireless identification tag of claim 7, wherein said processor implements at least one of said first timer, said second timer and said address decoder.

9. The wireless identification tag of claim 7, wherein said processor is coupled to a battery status monitor for determining a level of charge of said battery, wherein said processor receives a command from said receiver requesting transmission of battery status to said system, and wherein said transmitter transmits said battery status in conformity with reception of said command.

10. The wireless identification tag of claim 7, wherein, wherein said processor receives data from said receiver corresponding to a new identifier of said wireless identification tag, and wherein said processor replaces said identifier of said wireless identification tag with said new identifier.

11. The wireless identification tag of claim 1, further comprising a sniffer circuit for determining whether or not another device in communication with said system is transmitting, whereby said periodic transmission of said transmitter and said predetermined period of time is delayed in response to determining that said other device is transmitting.

12. The wireless identification tag of claim 1, wherein said system is a wireless local area network (WLAN), wherein said transmitter transmits signals on a WLAN channel and wherein said receiver receives WLAN system signals.

13. The wireless identification tag of claim 12, wherein said transmitter transmits a signal on said channel bearing an address not corresponding to any unit of said WLAN, whereby standard WLAN receivers within said WLAN ignore said signal.

14. The wireless identification tag of claim 12, wherein said transmitter transmits a spread spectrum direct sequence signal on said channel that has a direct sequence code differing from than a standard Barker direct sequence 11-bit code of said WLAN, whereby standard receivers within said WLAN reject said signal.

15. The wireless identification tag of claim 12, wherein said transmitter transmits a signal on said channel that has a preamble differing from than a standard preamble of said WLAN, whereby standard receivers within said WLAN reject said signal.

16. The wireless identification tag of claim 12, wherein said receiver receives a signal on said channel that has at least one of: a modulation type, bit rate and format differing from a standard modulation type, bit rate and format of said WLAN, whereby standard receivers within said WLAN reject said signal while said receiver accepts said signal.

17. The wireless identification tag of claim 1, wherein said transmitter further includes an input for receiving data from an external device, and wherein said transmitter transmits a signal that bears information from said external device coupled to said input.

18. The wireless identification tag of claim 17, wherein said external device is a sensor.

19. A method of operating a wireless identification tag, comprising:
   transmitting a signal from said identification tag at periodic intervals, said signal bearing an identifier of said wireless identification tag; and
   operating a receiver within said wireless identification tag for only a predetermined period of time subsequent to an end of said periodic intervals, whereby signals from external devices may be received while reducing battery energy use by said receiver;
   wherein said signal transmits one, or more stored parameter values corresponding to said predetermined period of time, a period of said signal, a start time of said signal and amplitude of said signal, whereby external devices can determine said one or more stored parameter values.

20. The method of claim 19, further comprising:
   receiving signals from said external devices by said receiver, said signals bearing an identification tag address;
   decoding said tag address to determine whether or not said tag address matches a particular address of said wireless identification tag; and
   in response to determining that said tag address does not match said particular address, deactivating said receiver.

21. The method of claim 20, further comprising:
   receiving signals from said external devices by said receiver, said signals bearing an identification tag address;
   decoding said tag address to determine whether or not said tag address matches a particular address of said wireless identification tag; and
   in response to determining that said tag address matches said particular address, keeping said receiver active after expiration of said predetermined period of time, whereby at least one of data and commands transmitted from said external devices to said wireless identification tag are received.

22. The method of claim 19, further comprising:
   receiving signals from said external devices by said receiver; and
   decoding the one or more parameters from said received signals.

23. A wireless identification tag comprising:
a battery for powering internal circuits of said tag;
a transmitter for transmitting tag signals encoding at least an identifier of said wireless identification tag and one or more stored parameter values corresponding to a predetermined period of time, a period of said signal, a start time of said signal and amplitude of said signal;
a timer for activating said transmitter on a periodic basis to transmit said signals and deactivating said transmitter subsequent to transmitting said signals, whereby power consumption from said battery is conserved when said timer deactivates said transmitter;
means for receiving system signals bearing at least one of commands and data from an external system.

24. The wireless identification tag of claim 23, wherein said system is a wireless local area network (WLAN), and wherein said system signals and said tag signals are WLAN-compatible signals.

* * * * *